(12) United States Patent
Steiner et al.

(10) Patent No.: US 8,471,687 B2
(45) Date of Patent: *Jun. 25, 2013

(54) METHOD AND APPARATUS FOR COMMUNICATING MESSAGE SIGNALS IN A LOAD CONTROL SYSTEM

(75) Inventors: James P. Steiner, Royersford, PA (US); Aaron Dobbins, Hopedale, MA (US); Edward J. Blair, Lansdale, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,704

(22) Filed: Oct. 11, 2011

(65) Prior Publication Data

US 2012/0051444 A1 Mar. 1, 2012

Related U.S. Application Data

(63) Continuation of application No. 11/447,431, filed on Jun. 6, 2006, now Pat. No. 8,068,014.

(60) Provisional application No. 60/687,689, filed on Jun. 6, 2005.

(51) Int. Cl.
*H04L 25/00* (2006.01)

(52) U.S. Cl.
USPC ...................................... 340/12.32

(58) Field of Classification Search
USPC ............... 340/533, 534, 538, 538.11, 538.12, 340/538.13, 538.16, 538.17, 12.31, 12.32, 340/12.33, 12.34, 12.35, 12.36, 12.37, 12.38, 340/12.39
See application file for complete search history.

(56) References Cited

U.S. PATENT DOCUMENTS

| 3,641,326 A | 2/1972 | Harte |
| 4,186,873 A | 2/1980 | Geisler et al. |

(Continued)

FOREIGN PATENT DOCUMENTS

| JP | 58-66493 | 4/1983 |
| JP | 61-136327 | 6/1986 |

(Continued)

OTHER PUBLICATIONS

Milosevic, V. et al., "Effect of impulse noise rejection with median filter on binary digital receiver performance", *Electronics Letters*, vol. 25, No. Issue 6, Mar. 6, 1989, pp. 392-394.

(Continued)

*Primary Examiner* — Jennifer Mehmood
*Assistant Examiner* — Yong Hang Jiang
(74) *Attorney, Agent, or Firm* — Ostrolenk Faber LLP

(57) ABSTRACT

A system for independent control of electric motors and electric lights includes a plurality of two-wire wallstations coupled in series via power wires between an alternating-current (AC) source and a light/motor control unit. The light/motor control unit is preferably located in the same enclosure as an electric motor and an electric light and has two outputs for independent control of the motor and the light. The light/motor control unit and the wallstations each include a controller and a communication circuit that is coupled to the power wiring via a communication transformer and communicate with each other using a loop current carrier technique. The light/motor control unit and the wallstations utilize pseudo random orthogonal codes and a median filter in the communication process.

20 Claims, 16 Drawing Sheets

U.S. PATENT DOCUMENTS

| | | | |
|---|---|---|---|
| 4,211,956 A * | 7/1980 | Bloyd | 315/208 |
| 4,465,956 A | 8/1984 | Fowler | |
| 4,527,247 A | 7/1985 | Kaiser et al. | |
| 4,535,297 A * | 8/1985 | Puckette | 329/303 |
| 4,560,909 A * | 12/1985 | Peil | 315/291 |
| 4,563,592 A | 1/1986 | Yuhasz et al. | |
| 4,641,322 A | 2/1987 | Hasegawa | |
| 4,689,547 A | 8/1987 | Rowen et al. | |
| 4,716,409 A | 12/1987 | Hart et al. | |
| 4,719,446 A | 1/1988 | Hart | |
| 4,742,475 A * | 5/1988 | Kaiser et al. | 700/278 |
| 4,745,351 A | 5/1988 | Rowen et al. | |
| 4,783,581 A | 11/1988 | Flowers et al. | |
| 4,785,195 A | 11/1988 | Rochelle et al. | |
| 4,841,221 A | 6/1989 | Barney et al. | |
| 4,990,908 A | 2/1991 | Tung | |
| 5,187,472 A | 2/1993 | Hart et al. | |
| 5,189,412 A | 2/1993 | Mehta et al. | |
| 5,248,919 A | 9/1993 | Hanna et al. | |
| 5,365,154 A | 11/1994 | Schneider et al. | |
| 5,798,581 A | 8/1998 | Keagy et al. | |
| 6,313,588 B1 | 11/2001 | Mosebrook et al. | |
| 6,346,781 B1 | 2/2002 | Mosebrook et al. | |
| 6,658,250 B1 | 12/2003 | Ganesan et al. | |
| 6,704,546 B1 | 3/2004 | Lucidarme et al. | |
| 6,798,341 B1 | 9/2004 | Eckel et al. | |
| 7,012,518 B2 | 3/2006 | Novikov | |
| 7,034,899 B2 | 4/2006 | Symoen et al. | |
| 7,163,158 B2 * | 1/2007 | Rossi et al. | 236/51 |
| 2002/0024425 A1 | 2/2002 | Chiriatti | |
| 2002/0060751 A1 * | 5/2002 | Rowe et al. | 348/678 |
| 2002/0098867 A1 | 7/2002 | Meiksin et al. | |
| 2002/0098868 A1 | 7/2002 | Meiksin et al. | |
| 2004/0075535 A1 | 4/2004 | Propp et al. | |
| 2005/0011655 A1 | 1/2005 | Crowell et al. | |

FOREIGN PATENT DOCUMENTS

| | | |
|---|---|---|
| JP | 61-207149 | 9/1986 |
| JP | 62-107539 | 5/1987 |
| JP | 04-340615 | 11/1992 |
| JP | 06-062284 | 3/1994 |
| JP | 10-135878 | 5/1998 |
| JP | 11195963 | 7/1999 |
| JP | 2000-501275 | 2/2000 |
| JP | 2001-168729 | 6/2001 |
| JP | 2004-140756 | 5/2004 |
| JP | 2004-222312 | 8/2004 |
| WO | WO 01/41383 | 6/2001 |

OTHER PUBLICATIONS

Echelon Corporation, LonWorks PLT-22 Power Line Tranceiver User's Guide, Version 1.2, 2002, pp. 1-60.
Echelon Corporation, PLT-22 Power Line Transceiver Datasheet, 2002, 3 pages.
X-10 Pro, X-10 Communications Protocol and Power Line Interface Tech Note, not dated, 11 pages.
Intellon Corporation, SSC P485 PL Transceiver IC Technical Data Sheet, Feb. 2002, 21 pages.
National Semiconductor, LM1893/LM2893 Carrier-Current Transceiver Datasheet, Apr. 1995, 24 pages.
National Semiconductor, Application Note 919: Designing Systems with the IC/SS Power Line Carrier Chipset, Jan. 1994, 22 pages.
ST Microelectronics, ST7538 Power Line FSK Transceiver Datasheet, Sep. 2003, 30 pages.
Gallagher, Jr., Neal, C., Wise, Gary L., A Theoretical Analysis of the Properties of Median Filters, IEEE Transactions on Acoustics, Speech, and Signal Processing, Dec. 1981, pp. 1136-1141, vol. ASSP-29.
Nodes, Thomas A., Gallagher Jr., Neal, C., Median Filters: Some Modifications and Their Properties, IEEE Transactions on Acoustics, Speech, and Signal Processing, Oct. 1982, pp. 739-746, vol. ASSP-30.
Fitch, J. Patrick, Coyle, Edward J., Gallagher, Jr., Neal, C., Root Properties and Convergence Rates of Median Filters, IEEE Transactions on Acoustics, Speech, and Signal Processing, Feb. 1985, pp. 230-240, vol. ASSP-33.
Hankerson, D.R. Hoffman, D.G., Leonard, D.A., Lindner, C.C., Phelps, K.T. Rodger, C.A., Wall, J.R., Chapter 5: BCH Codes, Coding Theory and Cryptology: The Essentials $2^{nd}$ edition, 2000, pp. front cover, inside front cover, 111-126, rear cover, Marcel Dekker, Inc. New York, NY.
English translation of Japanese Office Action dated Mar. 31, 2011 in corresponding Japanese Patent Application No. 2008-515814.
English translation of European Office Action dated Mar. 29, 2011 in corresponding European Patent Application No. 06772241.3-1246.
Office Action issued by the Mexican Patent Office on Jan. 7, 2011 in connection with corresponding Mexican Patent Application No. 7015379.
E-mail from Mexican associate dated Feb. 4, 2011 forwarding the Office Action dated Jan. 7, 2011 including discussion of relevancy thereof.
Search Report issued by PCT on Apr. 2, 2007 in connection with corresponding PCT application No. PCT/US2006/021861.

* cited by examiner

METHOD AND APPARATUS FOR COMMUNICATING MESSAGE SIGNALS IN A LOAD CONTROL SYSTEM

CROSS REFERENCE TO RELATED APPLICATION

The present application is a continuation under 37 C.F.R. §1.53(b) of prior application Ser. No. 11/447,431 filed Jun. 6, 2006, now U.S. Pat. No. 8,068,014 by James P. Steiner et al. entitled SYSTEM FOR CONTROL OF LIGHTS AND MOTORS, which application claims the benefit and priority of U.S. Provisional Application Ser. No. 60/687,689, filed Jun. 6, 2005, entitled SYSTEM FOR CONTROL OF LIGHT AND MOTORS, the entire disclosure of which is hereby incorporated by reference.

BACKGROUND OF THE INVENTION

1. Field of the Invention

The present invention relates to an apparatus for independently controlling a motor, such as, for example, a fan motor, together with a lighting source contained within the same enclosure as the motor and coupled to the motor. The invention also relates to a communication scheme for communicating over a power line to control the load, such as, for example, a fan motor and a light.

2. Description of the Related Art

It is often desirable to include a lamp and a fan motor in a single enclosure. Since the lamp and the fan motor are often wired in parallel, the lamp and the fan motor are generally controlled together from a switch located remotely from the lamp and the motor. FIG. 1A shows a prior art light and fan motor control system 10. The system 10 includes a maintained switch 12 coupled between an alternating-current (AC) voltage source 14 and two loads, i.e., a fan motor 16 and a lighting load 18, in an enclosure 19. The fan motor 16 and the lighting load 18 are connected in parallel such that when switch 12 is closed, the fan motor 16 and the lighting load 18 will both be on, and when the switch 12 is open, the fan motor 16 and the lighting load 18 will both be off.

There are also various schemes for independent control of a fan motor as well as a lighting load from a remote location such as a wallstation. FIG. 1B shows a prior art light and fan motor control system 20, having a dual light and fan speed control 22 coupled to the AC voltage source 14. The dual light and fan speed control 22 has two outputs: the first coupled to the fan motor 16 and the second coupled to the lighting load 18, to allow for independent control of the loads. Further, the dual light and fan speed control 22 includes a fan speed circuit for adjusting the speed at which the fan motor 16 turns and a dimmer circuit for changing the intensity of the lighting load 18. The dual light and fan speed control 22 is often mounted in a standard electrical wallbox and includes a user interface to allow a user to separately control the lighting load and the fan motor.

However, the dual light and fan speed control 22 requires two separate wires to be connected between the lamp and the fan motor. If these two connections are not provided between the wallbox and the enclosure containing the lamp and the fan motor, independent control of the lighting load 18 and the fan motor 16 will not be possible. Further, in the control system 20 of FIG. 1B, it is only possible to have one dual light and fan speed control 22, and thus, only one user interface to allow for adjustment of the intensity of the lighting load 18 and the speed of the fan motor 16. Control of the fan motor 16 and lighting load 18 from more than one location is not possible in this system.

FIG. 1C shows a prior art power-line carrier (PLC) control system 30. Power-line carrier control systems use the power system wiring to transmit control signals at high frequencies (i.e., much greater than the line frequency of 50 Hz or 60 Hz). All devices of the PLC system 30 are coupled across an AC power source 32 (from hot to neutral) to receive both power and communications from the same wiring. The system 30 includes a PLC fan motor controller 34 coupled to a fan motor 36, a PLC light controller 38 coupled to a lighting load 40, and a remote control keypad 42. The remote control keypad 42 is operable to transmit a message across the power line to the PLC fan motor controller 34 and the PLC light controller 38 to control the respective loads. One example of a communication protocol for home automation using power-line carrier technology is the industry standard X10. The X10 protocol uses a voltage carrier technique to transmit messages between devices connected to the power system. Through the voltage carrier technology, the messages are transmitted on voltages signals referenced either between the hot and neutral connections of the AC power source 32 or between the hot connection of the AC power source and an earth ground connection. The devices in an X10 system communicate using house addresses and unit addresses.

However, existing power-line carrier systems have some limitations. For example, all devices in a PLC system require a neutral connection. Also, since the X10 protocol utilizes voltage carrier technology, communication messages are transmitted throughout the power system and it is difficult to isolate the communication signals from other devices connected to the power system. Finally, the X10 protocol is not a "reliable" communication scheme since no acknowledgements are sent to a transmitting device when a receiving device has received a valid message.

Thus, it is desirable to provide a reliable means to independently control from a remote location a fan motor and a lighting load that are located in the same enclosure. Since a consumer may wish to locate the fan motor and the attached lamp in a position previously occupied by only a lamp controlled by a standard single-pole single-throw (SPST) wall switch, it is desirable to be able to control a fan motor as well as an attached lamp independently, using a two-wire control device. A two-wire device is a control device that has only two electrical connections, i.e., one for the AC source voltage and one for the fan/lamp, and does not have a neutral line connection. As shown in FIG. 1A, this kind of system typically only includes the switch 12 in series electrical connection between the AC source 14 and the loads, and no neutral connection is available in the electrical wallbox where the switch is housed. Since it is desirable to control the fan motor 16 and the lighting load 18 independently, using the existing building wiring, it is necessary to develop a means to allow independent control over the existing building wiring consisting of a single wire connecting the wall control, i.e., the dual light and fan speed control 22, to the enclosure of the fan motor 16 and the lighting load 18.

Prior art systems to accomplish this are known which provide a coding/communication scheme to independently control the fan motor and the lamp. However, many of these systems are unreliable, provide erratic, noisy operation, and require a neutral connection. It is desirable to provide a simple, reliable communication scheme for independently controlling the fan motor and lamp without a neutral connection.

SUMMARY OF THE INVENTION

The invention provides a system for communicating between a first control circuit portion and a remote second control circuit portion over electrical power wiring of a building. The first control circuit portion has a user actuable control for remotely controlling an electrical load controlled by the second control circuit portion. The system comprises a transmitter in the first circuit portion and a receiver in the second circuit portion. The transmitter in the first circuit portion is operable to transmit control information over the power wiring to the second circuit portion, while the receiver in the second circuit portion is operable to receive the control information transmitted over the power wiring by the first circuit portion for controlling the load. The first and second circuit portions each include a current responsive element coupled to the building power wiring for establishing a current signal loop in the building power wiring between the first and second control circuit portions for the exchange of the control information. The electrical load preferably comprises an electrical motor.

The invention further provides a two-wire load control system for controlling the power delivered to an electrical load from an AC voltage source. The two-wire load control system comprises a load control device and a two-wire remote control device. The load control device is coupled to the electrical load for control of the load. The load control device comprises a first current responsive element operatively coupled in series electrical connection between the AC source and the electrical load and a first communication circuit coupled to the first current responsive element for receiving message signals. The two-wire remote control device comprises a second current responsive element operatively coupled in series electrical connection between the AC source and the electrical load and a second communication circuit coupled to the second current responsive element for transmitting the message signals. The first current responsive element and the second current responsive element are operable to conduct a communication loop current. The first communication circuit is operable to transmit and the second communication circuit operable to receive the message signals via the communication loop current. Preferably, the first and second communication circuits are operable to both transmit and receive the message signals via the communication loop current.

According to another embodiment of the present invention, a two-wire load control system for controlling the power delivered to a plurality of electrical loads from an AC voltage source comprises a load control device, a two-wire remote control device, and a capacitor coupled in shunt electrical connection with the plurality of loads. The plurality of loads and the AC voltage source are coupled together at a common neutral connection. The load control device is coupled to the plurality of loads and is operable to individually control each of the plurality of loads. The load control device comprises a first current responsive element coupled in series electrical connection between the AC source and the plurality of loads and a first communication circuit coupled to the first current responsive element for receipt of a message signal for controlling the plurality of loads. The two-wire remote control device comprises a second current responsive element coupled in series electrical connection between the AC source and the plurality of loads and a second communication circuit coupled to the second current responsive element for transmission of the message signal for controlling the plurality of loads. The capacitor, the AC source, the first current responsive element, and the second current responsive element are operable to conduct a communication loop current. The second communication circuit is operable to transmit communication signals to the first communication circuit via the communication loop current.

The invention furthermore comprises a method for communicating between a first control circuit portion having a first current responsive element and a remote second control circuit portion having a second current responsive element over electrical power wiring of a building to control the operation of an electric motor, the first control circuit portion having a user actuable control for remotely controlling the electric motor controlled by the second control circuit portion, the method comprising the steps of: (1) coupling the first current responsive element to the electrical power wiring; (2) coupling the second current responsive element to the electrical power wiring; (3) establishing a current signal loop in the electrical power wiring between the first and second current responsive elements; (4) transmitting control information over the electrical power wiring from the first control circuit portion to the second control circuit portion; and (5) receiving the control information at the second circuit portion for controlling the electric motor.

In addition, the present invention provides a method for communicating a digital message from a two-wire remote control device to a load control device for independently controlling the power delivered to a plurality of loads from an AC voltage source. The method comprises the steps of: (1) coupling the two-wire remote control device in series electrical connection between the AC source and the load control device; (2) coupling a capacitor in shunt electrical connection across the plurality of loads; (3) conducting a communication loop current through the AC source, the two-wire remote control device, the load control device, and the capacitor; and (4) transmitting the digital message from the two-wire remote control device to the load control device via the current loop.

The present invention further provides a method for assigning a system address to a control device in a load control system for controlling the amount of power delivered to an electrical load from an AC voltage source. The method comprising the steps of: (1) coupling the control device in series electrical connection between the electrical load and the AC voltage source via a power wiring, such that a load current is operable to flow on the power wiring from the AC voltage source to the electrical load through the control device; (2) applying power to the control device; (3) subsequently transmitting an address initiation request via the power wiring; and (4) receiving the system address via the power wiring.

According to another aspect of the present invention, a method of filtering a received message signal having a sequence of samples comprises the steps of: (1) examining a set of N sequential samples of the received message signal; (2) determining the median of the N sequential samples; (3) providing the median as an output sample; and (4) repeating the steps of examining a set of N sequential samples, determining the median, and providing the median.

Further, the present invention provides a method of communicating a message signal from a first control device to a second control device. The message signal comprises a sequence of samples. The method comprises the steps of: (1) transmitting the message signal from the first control device; (2) receiving the message signal at the second control device; (3) examining a set of N sequential samples of the received message signal; (4) determining the median of the N sequential samples; (5) providing the median as an output sample; and (6) repeating the steps of examining a set of N sequential samples, determining the median, and providing the median.

Other features and advantages of the present invention will become apparent from the following description of the invention, which refers to the accompanying drawings.

BRIEF DESCRIPTION OF THE DRAWINGS

The invention will now be describe in greater detail in the following detailed description with reference to the drawings in which.

DETAILED DESCRIPTION OF PREFERRED EMBODIMENTS OF THE INVENTION

Figure 1A:
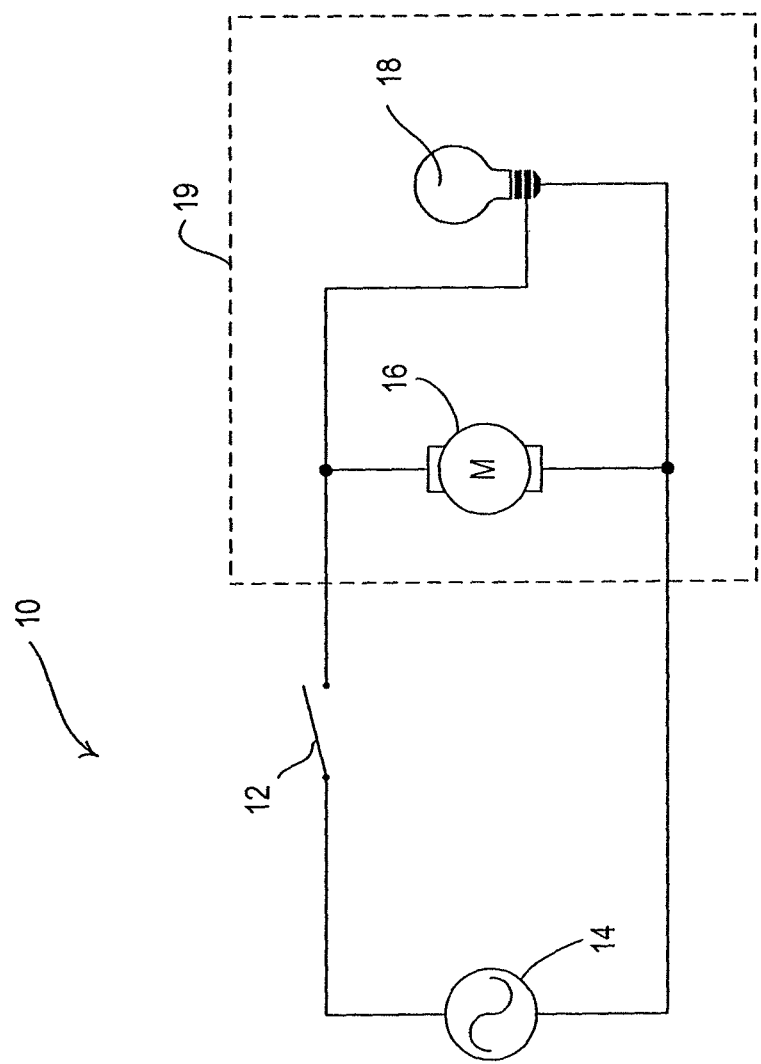
FIG. 1A is a simplified block diagram of a prior art electric light and electric motor control system.
Figure 1B:
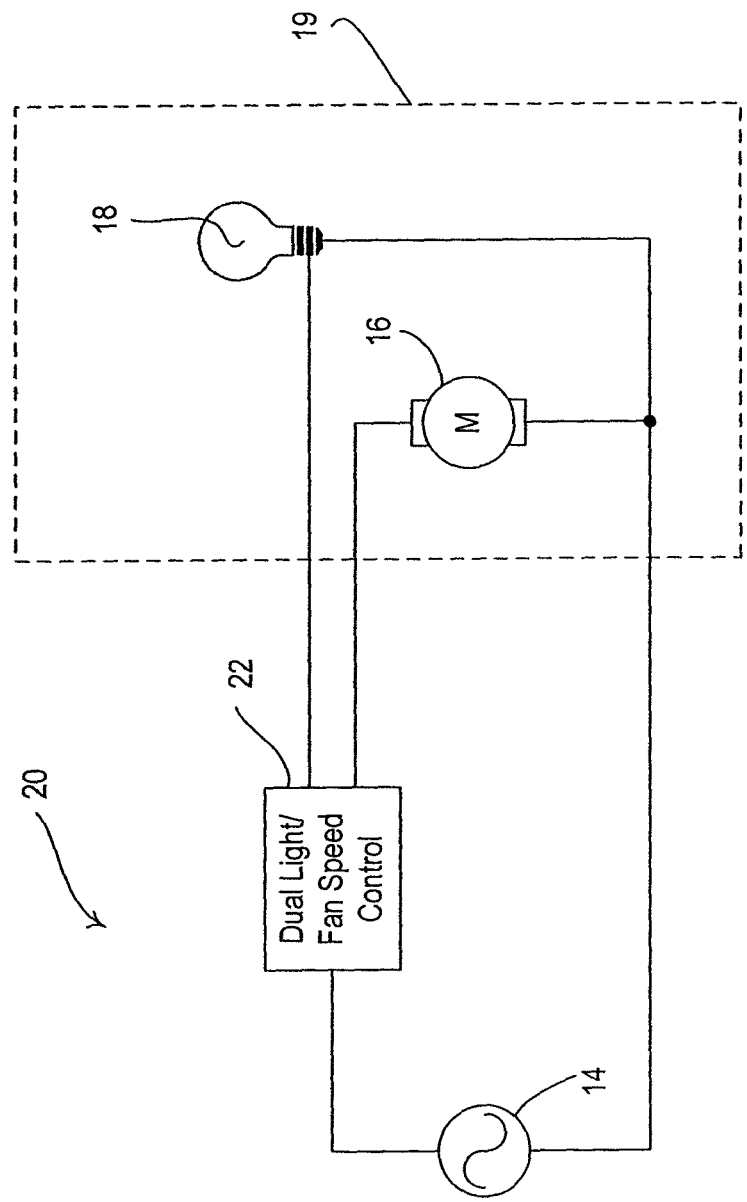
FIG. 1B is a simplified block diagram of a prior art electric light and electric motor control system including a dual light and motor speed control.
Figure 1C:
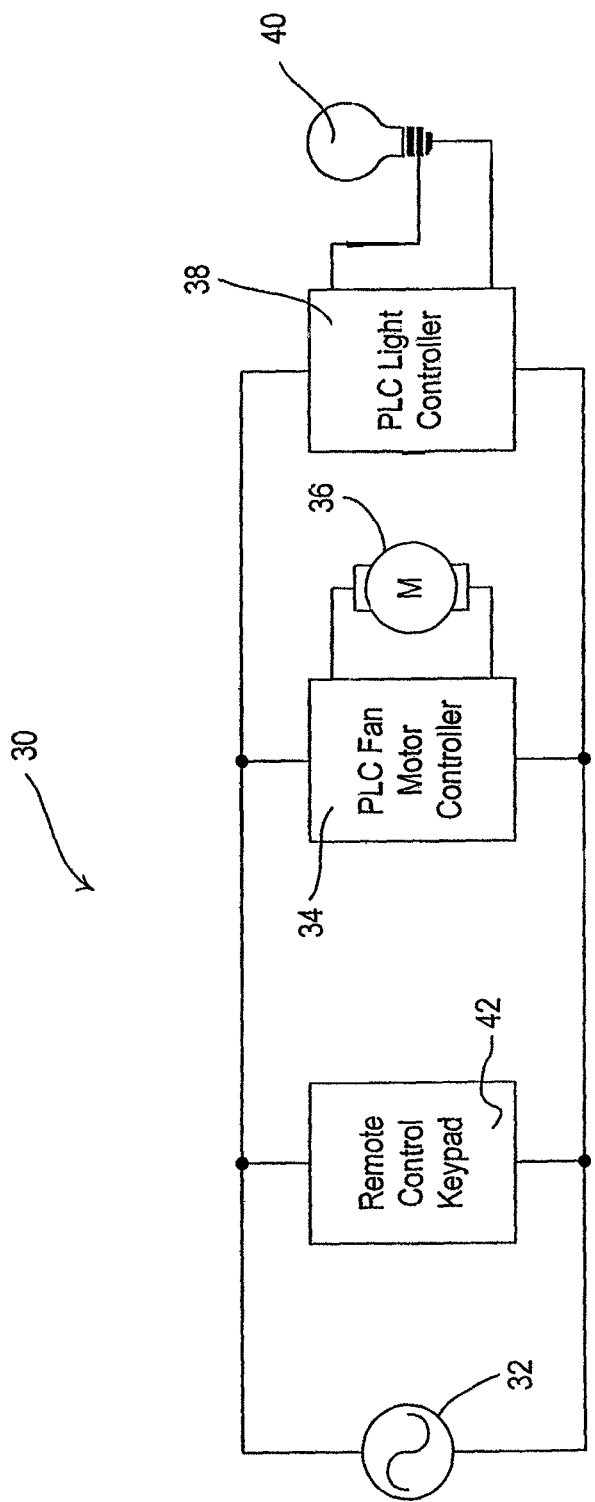
FIG. 1C is a simplified block diagram of a prior art power-line carrier control system for controlling an electric motor and an electric light.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

As is well known, a lamp and a fan motor are typically packaged in the same housing. It is desirable to be able to control the lamp and fan motor independently from the same remote location, by, for example, a wallstation. However, the two circuits to control the lamp and the fan motor are typically different. The lamp may be controlled by a series switch, typically a phase-angle dimmer. The fan motor may be controlled by a shunt switch in parallel with the fan motor, such as is disclosed in commonly-assigned U.S. patent application, Ser. No. 11/447,728, filed on Jun. 6, 2006, now U.S. Pat. No. 7,330,004, entitled METHOD AND APPARATUS FOR QUIET VARIABLE MOTOR SPEED CONTROL, the entire disclosure of which is hereby incorporated by reference.

Figure 2:
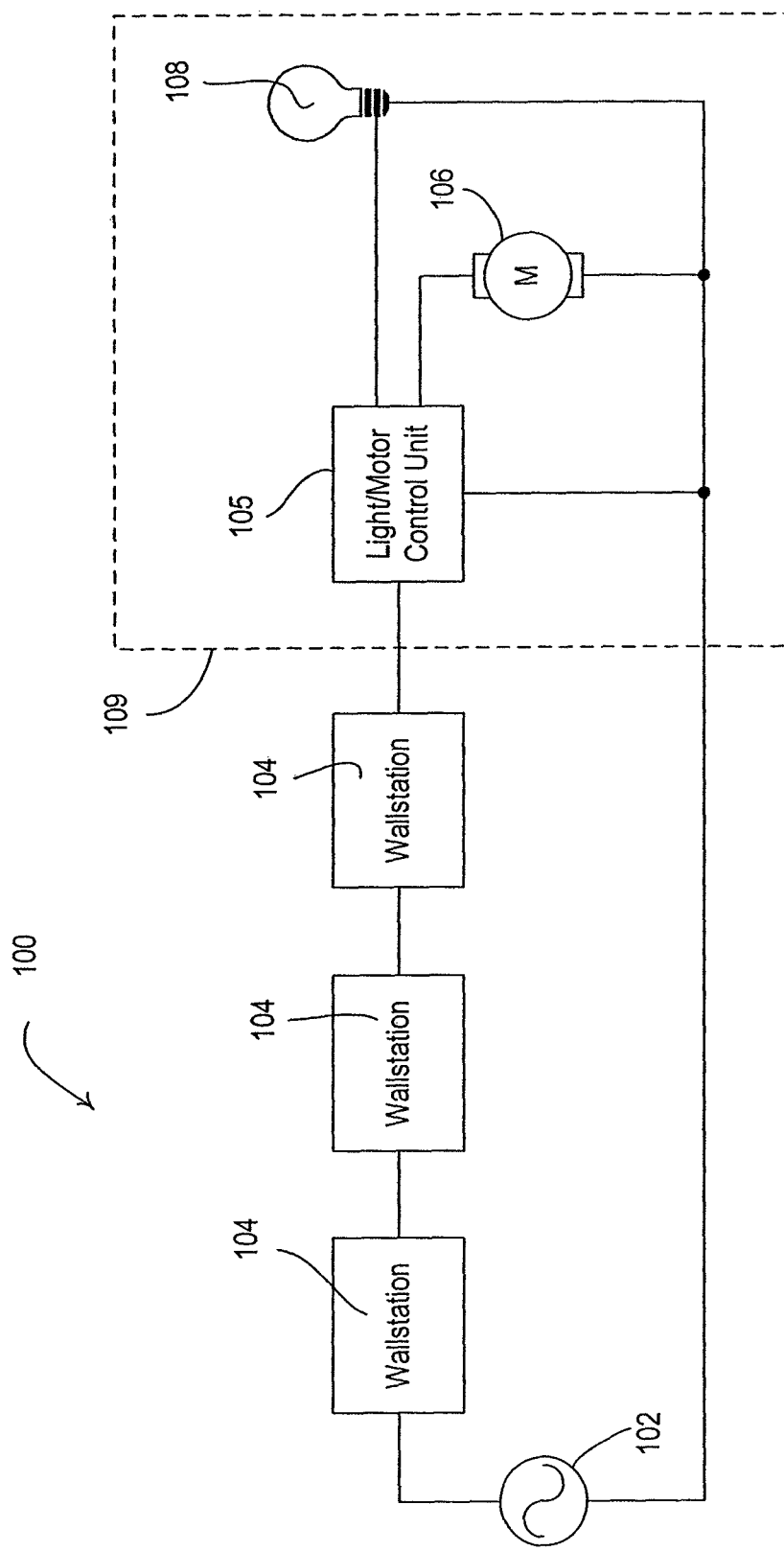
FIG. 2 is a simplified block diagram of a system for control of electric lights and electric motors according to the present invention.

A block diagram of a system 100 for independent control of lights and fan motors according to the present invention is shown in FIG. 2. The system includes a plurality of wallstations 104 that are connected in series between an AC voltage source 102 and a light/motor control unit 105 over the electrical power wiring of a building to form a power loop. The light/motor control unit 105 is operable to control both the speed of a fan motor 106 and the intensity of a lighting load 108. The fan motor 106 and the lighting load 108 are preferably both mounted in a single enclosure 109 (sometimes referred to as the "canopy").

In the system 100 of FIG. 2, it is desirable to provide substantially the full AC voltage from the AC voltage source 102 to the light/motor control unit 105 for operation of the fan motor 106 and the lighting load 108. Since the wallstations 104 are in series electrical connection, it is desirable to minimize the voltage drop across each wallstation 104. Thus, it is not desirable to develop a significant voltage across each of the wallstations 104 in order to charge an internal power supply to power the low-voltage circuitry of the wallstation.

Figure 3:
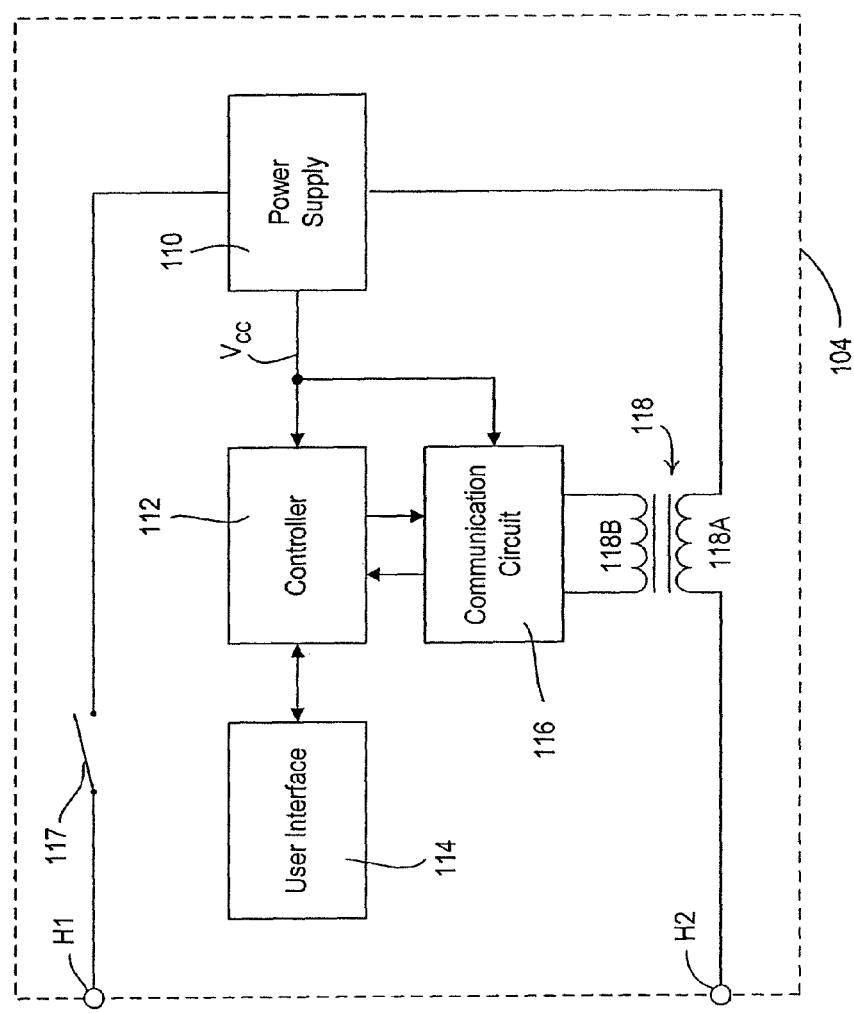
FIG. 3 is a simplified block diagram of a wallstation of the system of FIG. 2.

A simplified block diagram of the wallstation 104 is shown in FIG. 3. A power supply 110 is provided in series between a first electrical terminal H1 and a second electrical terminal H2. The power supply 110 provides a DC voltage, $V_{cc}$, to power a controller 112 and a communication circuit 116. The operation of the power supply 110 is described in greater detail in commonly-assigned U.S. patent application, Ser. No. 11/447,489, filed Jun. 6, 2006, now U.S. Pat. No. 7,423,413, entitled POWER SUPPLY FOR A LOAD CONTROL DEVICE, the entire disclosure of which is hereby incorporated by reference.

The controller 112 is preferably implemented as a microcontroller, but may be any suitable processing device, such as a programmable logic device (PLD), a microprocessor, or an application specific integrated circuit (ASIC). A user interface 114 includes a plurality of buttons for receiving inputs from a user and a plurality of light emitting diodes (LEDs) for providing visual feedback to the user. The controller 112 accepts control inputs from the buttons of the user interface 114 and controls the operation of the LEDs. The operation of the LEDs is described in greater detail in commonly-assigned co-pending U.S. patent application Ser. No. 11/191,780, filed Jul. 28, 2005, entitled APPARATUS AND METHOD FOR DISPLAYING OPERATING CHARACTERISTICS ON STATUS INDICATORS, the entire disclosure of which is hereby incorporated by reference.

The controller 112 is coupled to the communication circuit 116 for transmitting and receiving control information to and from the light/motor control unit 105 and the other wallstations 104 of system 100. The communication circuit 116 transmits and receives the control information via a communication transformer 118 over the electrical power wiring coupled from the AC voltage source 102 to the wallstations 104 and the light/motor control unit 105. The communication transformer 118 has a primary winding 118A that is connected in series electrical connection with the terminals H1, H2 of the wallstation 104 and a secondary winding 118B that is coupled to the communication circuit 116.

The wallstation 104 further includes an air-gap switch 117 in series with the power supply 110. When the air-gap switch 117 is opened, power is removed from all devices of the system 100 since the devices are coupled in a power loop. To provide safety when servicing the loads, i.e., changing a light bulb canopy, the wallstations 104 are preferably coupled to the hot line of the electrical power wiring such that the hot line is not provided in the canopy when the air-gap switch 117 is open. However, the wallstations 104 may also be coupled to the neutral line.

Figure 4:
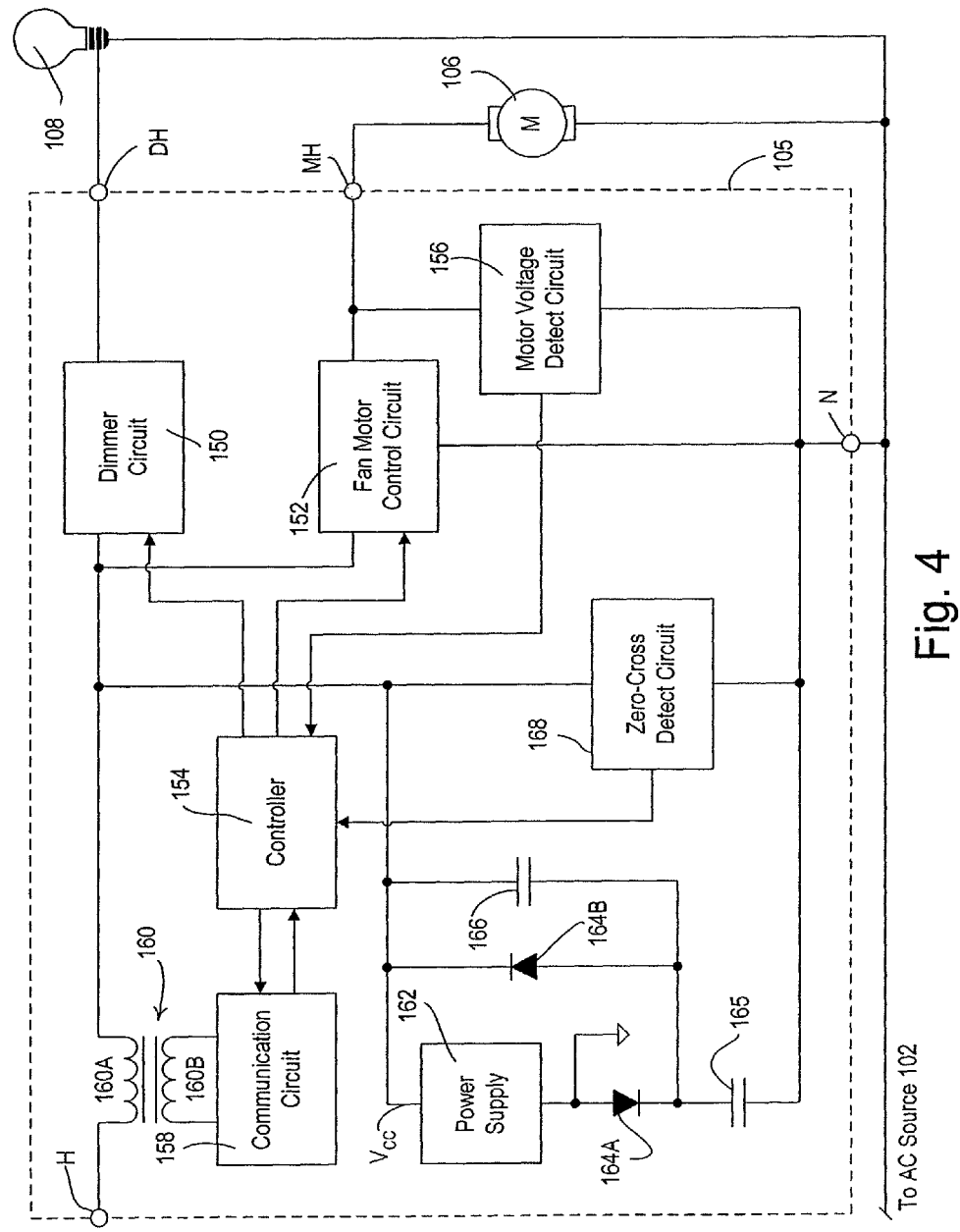
FIG. 4 is a simplified block diagram of a light/motor control of the system of FIG. 2.

A simplified block diagram of the light/motor control unit 105 is shown in FIG. 4. The light/motor control unit 105 includes a HOT terminal H, a neutral terminal N, a dimmed hot terminal DH connected to the lighting load 108, and a fan motor hot terminal MH connected to the fan motor 106. The light/motor control unit 105 includes a dimmer circuit 150 for controlling the intensity of the lighting load 108 and a fan motor control circuit 152 for controlling the rotational speed of the fan motor 106. The dimmer circuit 150 utilizes a semiconductor switch (not shown) to control the amount of current conducted to the lighting load 108 and thus the intensity of the lighting load. The conduction time of the semiconductor switch is controlled by a controller 154 using standard phase-control dimming techniques as is well known in the art.

A motor voltage detect circuit 156 determines the zero-crossings of the motor voltage across the fan motor 106 and provides a control signal to the controller 154, which operates the fan motor control circuit 152 accordingly. A zero-crossing of the motor voltage is defined as the time at which the motor voltage transitions from positive to negative polarity, or from negative to positive polarity, at the beginning of each half-cycle of the motor voltage. The operation of the fan motor control circuit 152 with the motor voltage detect circuit 156 is described in greater detail in previously-mentioned U.S. Pat. No. 7,330,004.

The controller 154 is coupled to a communication circuit 158, which transmits and receives control information over the electrical power wiring via a communication transformer 160. The communication transformer 160 is a current transformer that has a primary winding 160A that is connected in series with a hot terminal H of the motor/light control unit 105 and a secondary winding 160B that is coupled to the communication circuit 158.

A power supply 162 is coupled to the load-side of the communication transformer 160 and generates a DC voltage $V_{CC}$ to power the controller 154 and the other low-voltage circuitry. Two diodes 164A, 164B are provided such that the power supply is operable to charge only during the positive half cycles. The power supply 162 preferably comprises a capacitor (not shown) having a capacitance of approximately 680 µf. A capacitor 165 is coupled between the cathode of the diode 164A and the neutral terminal N and preferably has a capacitance of 2.2 µF.

A capacitor 166 is connected in parallel with the power supply 162 between the load-side of the communication transformer 160 and the cathode of the diode 164A. The capacitor 166 completes a communication loop with the wallstations 104 and isolates the communication transformer 160 from the high impedance of the fan motor 106, particularly when the fan motor 106 is off. The capacitor 166 is sized to pass the loop current carrier signal modulated with the control information, while blocking the 50/60 cycle power of the AC voltage source 102. A preferred value for the capacitor 166 is 10 nF.

A zero-cross detect circuit 168 is coupled between the load-side of the communication transformer 160 and the neutral terminal N for providing a signal representative of the zero-crossings of the AC voltage source 102 to the controller 154. A zero-crossing of the AC voltage is defined as the time at which the AC voltage transitions from positive to negative polarity, or from negative to positive polarity, at the beginning of each half-cycle of the AC voltage source 102. The controller 154 determines when to turn on or off the semiconductor switch of the dimmer circuit 150 each half-cycle by timing from each zero-crossing of the AC supply voltage.

Figure 5A:
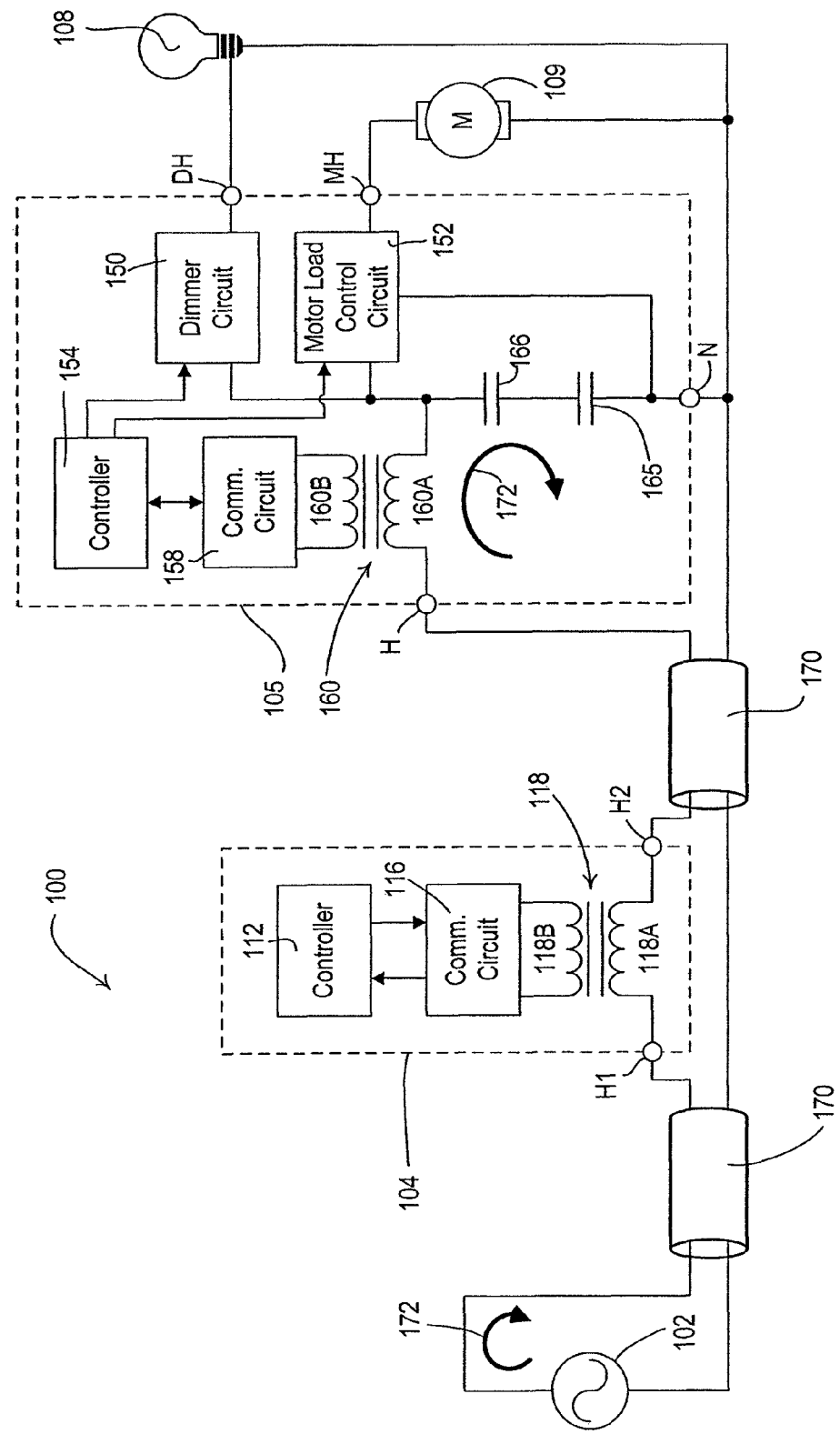
FIG. 5A shows a first example of the system of FIG. 2 demonstrating the current loop used for communication between the wallstations and the light/motor control unit.

The control system 100 preferably uses a current-carrier technique to communicate between the wallstations 104 and the light/motor control unit 105. FIG. 5A shows a first example of the system 100 for independent control of a lighting load 108 and a fan motor 106 demonstrating a communication loop current 172 used for communication between the wallstations 104 and the light/motor control unit 105. The load currents for powering the lighting load 108 and the fan motor 106 flow through the primary winding 118A of the communication transformer 118 of the wallstation 104 and the primary winding 160A of the communication transformer 160 of the light/motor control unit 105. Since the AC voltage source 102, the wallstation 104, and the light/motor control unit 105 are all located in different locations, a portion of building electrical power wiring 170 exists between the system components. The communication loop current 172 flows through the AC voltage source 102, the communication transformer 118 of the wallstation 104, the communication transformer 160, and the capacitors 165, 166 of the light/motor control unit 105. The capacitor 166 completes the communication loop and isolates the communication loop from the fan motor 106. The isolation is needed because the fan motor provides a high impedance when the fan motor 106 is off and the inductive nature of the fan motor attenuates the communication loop current 172.

After the controller 112 has received user-actuated control information from the actuator buttons of the user interface 114 (FIG. 3), the communication circuit 116 transmits a communication message from the controller via the communication transformer 118, which couples the control information onto the hot line. Since the same current flows through the primary winding 118A of the transformer 118 in the wallstation and the primary winding 160A of the transformer 160 in the light/motor control unit 105, the communication loop current 172 induces an output message on the secondary 160B of transformer 160. The output message is received by the communication circuit 158 of the light/motor control unit 105 and is then provided to the controller 154 to control the fan motor control circuit 152 and the dimmer circuit 150.

Figure 5B:
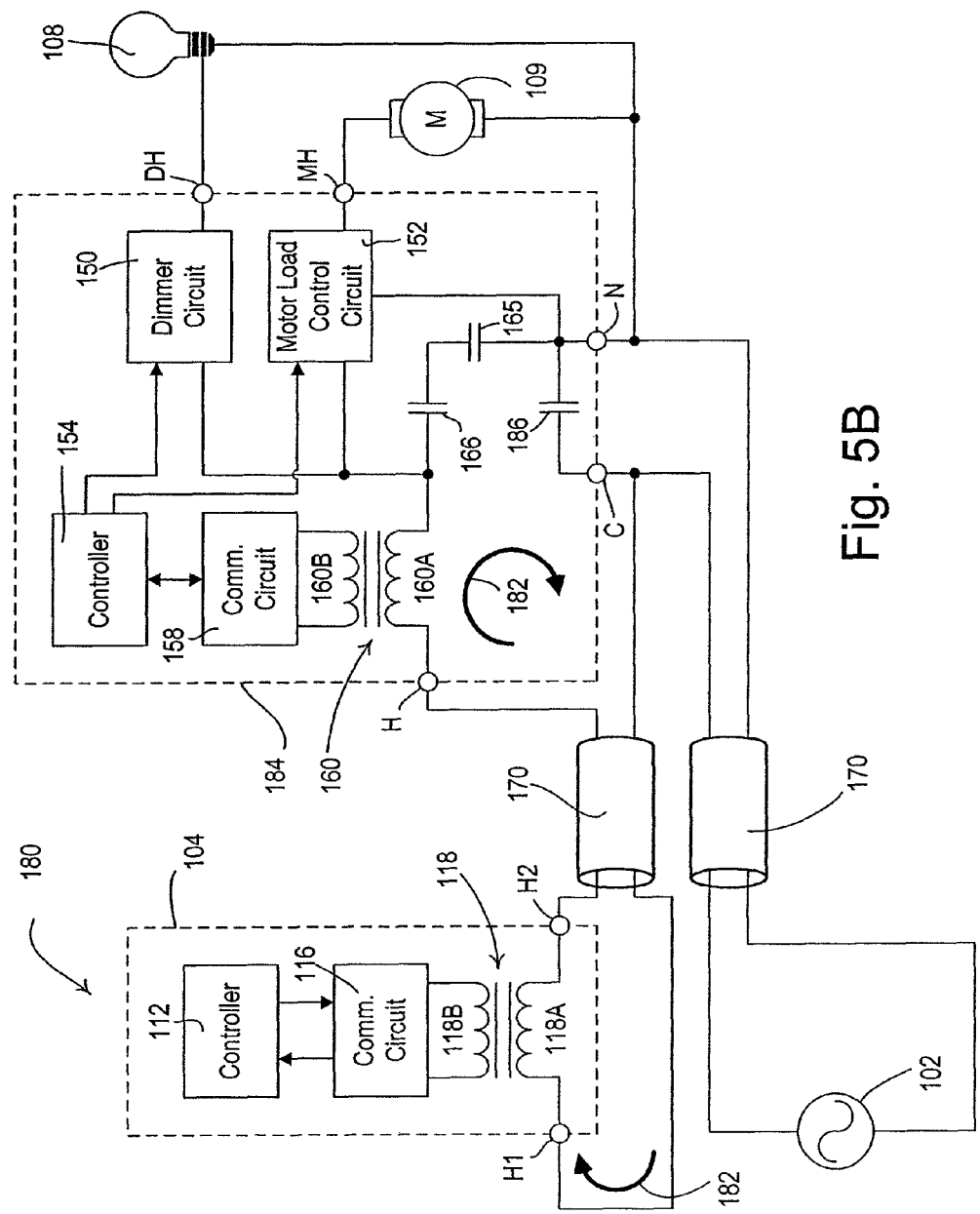
FIG. 5B shows a second example of a system for independent control of a lighting load and a motor load to demonstrate an optimal communication loop current.

FIG. 5B shows an example of a second system 180 for independent control of a lighting load 108 and a fan motor 106 demonstrating an optimal communication loop current 182 that does not flow through the AC voltage source 102, the fan motor 106, or the lighting load 108. Note that in this configuration, the hot side of the AC voltage source 102 is provided at the canopy, i.e., at the mounting enclosure 109 (FIG. 2) of the fan motor 106 and the lighting load 108. The system 180 includes a light/motor control unit 184 that comprises an additional communication terminal C and a capacitor 186 coupled between the terminal C and the neutral terminal N. In the layout of system 180, the terminal C is connected to the hot side of the AC voltage source 102 to complete the communication loop through the capacitor 186 such that the communication loop current 182 does not flow through the AC voltage source 102. The capacitor 186 is provided to terminate the communication loop and thereby prevent data being transferred between the wallstation 104 and the light/motor control unit 184 from entering the power system. The capacitor 186 is sized to pass the loop current carrier signal containing the control information, while blocking the 50/60 cycle power of the AC voltage source. A preferred value for the capacitor 186 is 10 nF.

Figure 5C:
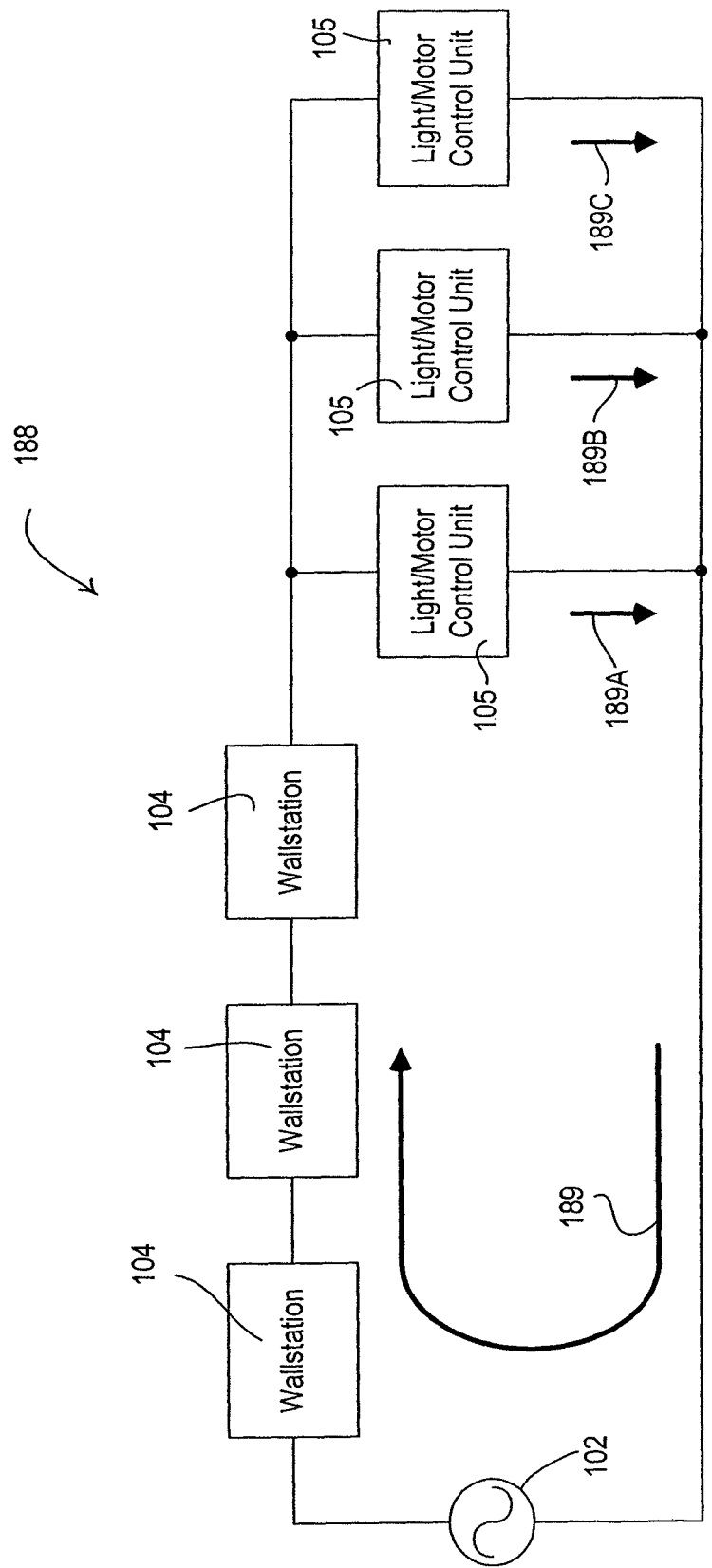
FIG. 5C is a simplified block diagram of a system for control of a plurality of loads according to another embodiment of the present invention.

FIG. 5C is a simplified block diagram of a system 189 for control of a plurality of loads according to another embodiment of the present invention. Three light/motor control units 105 are coupled in parallel electrical connection. Each of the light/motor control units 105 is coupled to a fan motor (not shown) and/or a lighting load (not shown). A communication loop current 189 flows through the wallstations 104 and communication currents 189A, 189B, 189C flow through each of the light/motor control units 105. The communication currents 189A, 189B, 189C each have a magnitude equal to approximately one-third of the magnitude of the communication current 189. Each of the wallstations 104 is operable to control all of the fan motors in unison and all of the lighting loads in unison. Power is removed from the all of the wallstations 104 and the light/motor control units 105 on the loop if the airgap switch 117 of any of the wallstations 104 is opened.

Figure 6A:
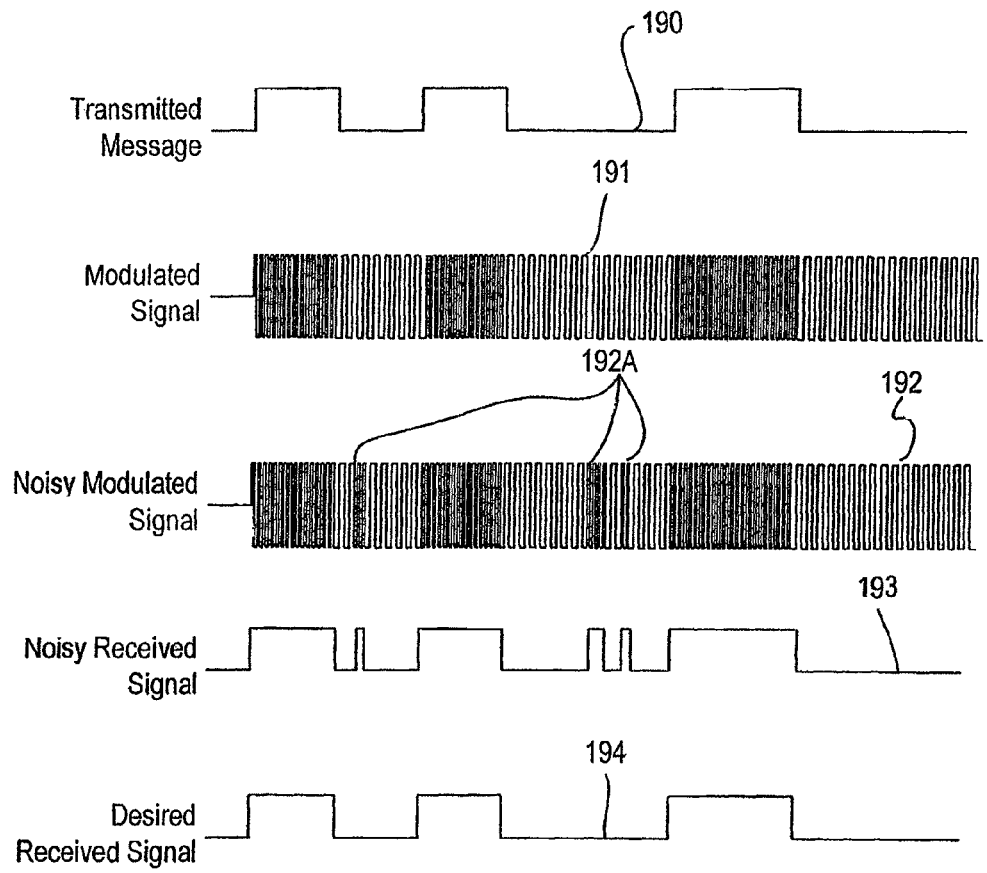
FIG. 6A shows example waveforms of the system of FIG. 2.

The message information may be modulated onto the hot line by any suitable modulation means, for example, amplitude modulation (AM), frequency modulation (FM), frequency shift keying (FSK), or binary phase shift keying (BPSK). FIG. 6A shows examples of the transmitted and received signals of the control system 100. A transmitted message signal 190 is provided, for example, by the controller 112 to the communication circuit 116 of the wallstation 104. The transmitted message signal 190 is modulated onto a carrier, e.g., frequency-modulated onto the carrier, by the communication circuit 116 to produce a modulated signal 191. During transmission, the modulated signal 191 is susceptible to noise and thus a noisy modulated signal 192 (which includes some noise 192A) will be received, for example, by the communication circuit 158 of the light/motor control unit 105. Accordingly, the communication circuit 158 will provide a noisy demodulated message 193 to the controller 154 of the light/motor control unit 105. In order to avoid generating a noisy demodulated message 193 and to obtain a desired received message 194, a suitable means for modulation, demodulation, and filtering is provided according to the invention (as will be described in greater detail below).

Figure 6B:
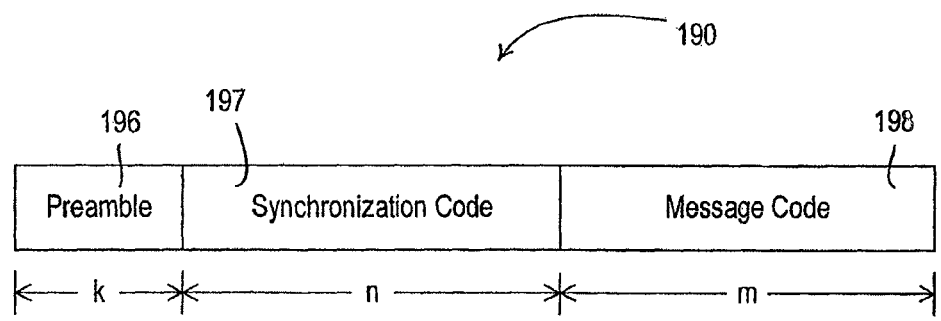
FIG. 6B shows the parts of a transmitted message of the system of FIG. 2.

According to FIG. 6B, a transmitted message signal 190 has three components: a preamble 196, a synchronization code 197, and the message code 198. The preamble 196 is a code that is k bits in length and is used to coordinate the demodulation and the decoding of a received message. The synchronization code 197 is an orthogonal pseudo random code with low cross-correlation properties that is n bits in length and that all devices in the loop of the system 100 try to detect in real time. The synchronization code also serves the purpose of an address. The presence of this code indicates that a message is contained in the message code 198 that follows. Finally, the message code 198 is a forward error correction code that is m bits in length that is received following the synchronization code. This bit stream is not decoded in real time but is passed to a message parser.

Figure 7:
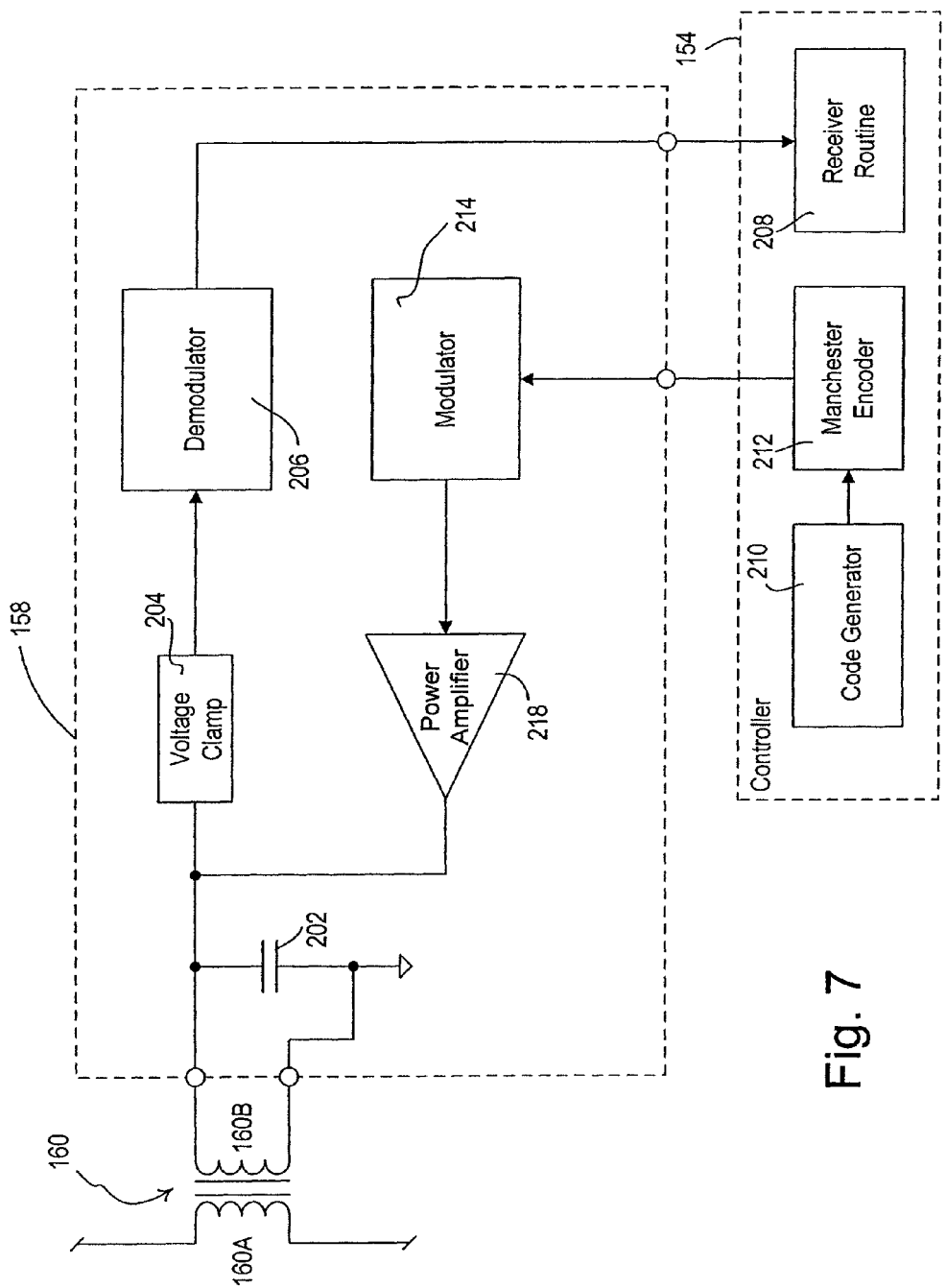
FIG. 7 shows a simplified block diagram of a communication circuit of the system of FIG. 2.

FIG. 7 shows a simplified block diagram of the communication circuit 158 of the motor/light control unit 105. The communication circuit 158 is coupled to the transformer 160, which operates along with a capacitor 202 as a tuned filter to pass substantially only signals at substantially the transmission frequency of the modulated signals 192, i.e., between 200 kHz and 300 kHz. The voltage across the capacitor 202 is provided to a voltage clamp 204 to protect against high voltage transients. A demodulator 206 receives the modulated message signal 192 and generates the demodulated received message signal 193 using standard demodulation techniques that are well-known in the art. The demodulated message signal 193 is provided to a receiver routine 208 of the controller 154 that will be described in more detail with reference to FIG. 8.

FIG. 7 also shows the transmitter portion of the communication circuit 158. The controller 154 implements a code generator 210 that produces the synchronization code 197 and the message code 198 of the transmitted message 190. Alternatively, the controller 154 could use a look-up table to generate the synchronization code 197 and the message code 198 based on the desired information to be transmitted for controlling the fan motor 106 and the lighting load 108.

In a preferred embodiment, the coded signal is thereafter encoded at a Manchester encoder 212. With Manchester encoding, a bit of data is signified by a transition from a high state to a low state, or vice versa, as is well known in the art. Although Manchester encoding is shown, other digital encoding schemes could be employed. The encoded signal is then modulated on a carrier signal by a modulator 214 using, for example, AM, FM, or BPSK modulation. After amplification by a power amplifier 218, the modulated signal is coupled to the tuned filter (comprising the capacitor 202 and the transformer 160) and is transmitted on to the hot line as a current signal. While the communication circuit 158 of the motor/light control unit 105 is described above and shown in FIG. 7, the communication circuit 116 of the wallstation 104 will have the same implementation.

Figure 8:
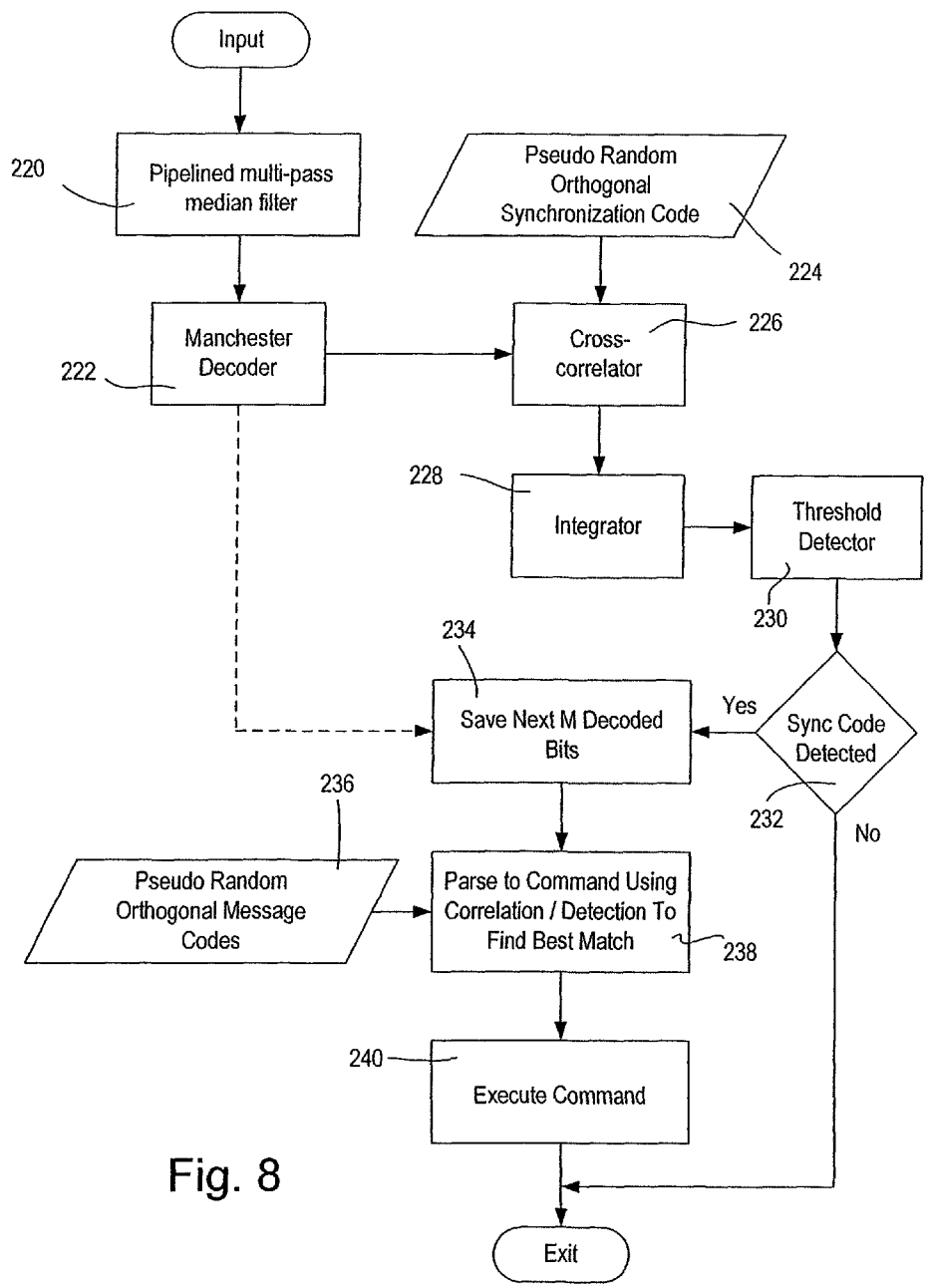
FIG. 8 shows a simplified flowchart of the process of a receiver routine implemented in a controller of the system of FIG. 2.
Figure 9A:
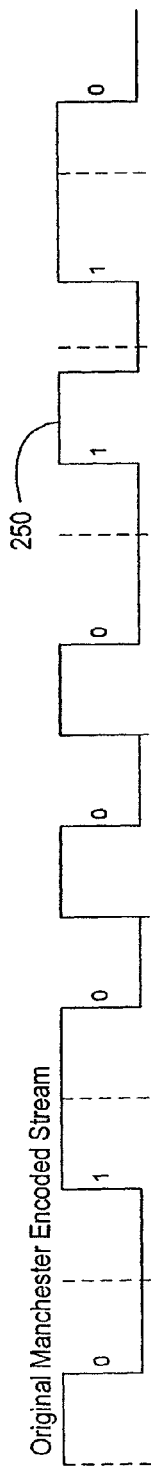
FIGS. 9A, 9B, and 9C show waveforms that demonstrate the operation of a median filter of the receiver routine of FIG. 8.
Figure 9B:
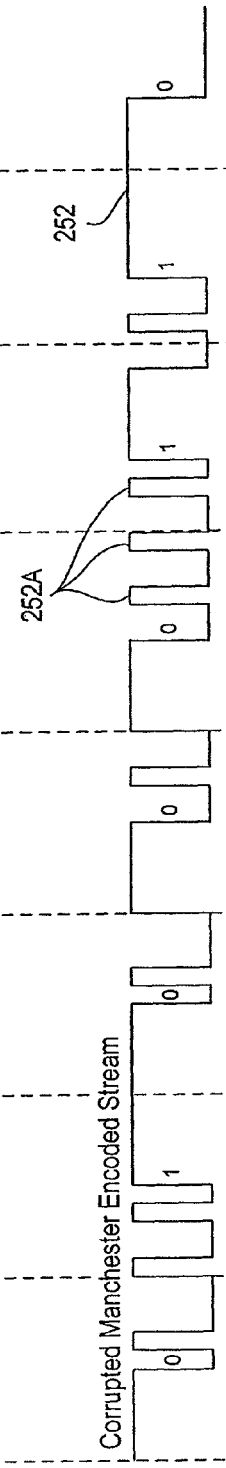
Figure 9C:
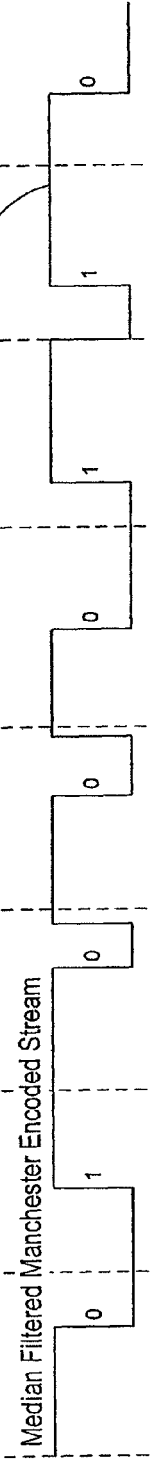

FIG. 8 shows a simplified block diagram of the process of the receiver routine 208 implemented in the controller 154. The demodulated signal 193 (i.e. the input to the receiver routine 208) is first filtered by a pipelined multi-pass median filter 220. FIGS. 9A, 9B, and 9C show waveforms that demonstrate the operation of the median filter 220. FIG. 9A shows an example of an original Manchester encoded stream 250, i.e., as generated by the Manchester encoder 212 of the controller 154 before transmission.

The original Manchester encoded stream 250 may be corrupted by noise during transmission such that a noisy Manchester encoded stream 252 shown in FIG. 9B (having noise impulses 252A) is provided to the controller of the receiving device. The transmitted current-carrier signals are much smaller in amplitude (approximately 5 mA) in comparison to the amplitude of the current used by the lighting load 108 and the fan motor 106 (approximately 5 A). Since the semiconductor switch of the dimmer circuit 150 controls the power delivered to the lighting load 108 using phase-control dimming, large current pulses through the lighting load 108 are induced in the communication transformers 118, 160. These large current pulses corrupt the modulated signal 191 and are detected as binary impulse noise in the demodulated bit stream. This is shown in the noisy Manchester encoded stream 252 by the plurality of noise impulses 252A that are not in the original Manchester encoded stream 250.

Most types of interference will only cause momentary excursions across the detection threshold. The resulting signal is much like digital shot noise and statistically is similar to the "random telegrapher's waveform". As such, it is very impulsive in nature and can be modeled to a first order as a Poisson point process.

The median filter 220 is used to eliminate the noise corruption to generate the filtered Manchester encoded stream 254 shown in FIG. 9C. The median filter 220 is ideally suited to filtering a binary stream as shown in FIG. 9B. A median filter of order N has a sliding window of width, W samples, defined by $$W = 2N+1 \quad \text{. (Equation 1)}$$

The median filter 220 preserves any "root signal" passing through the window. A root signal is defined as any signal that has a constant region N+1 points or greater with monotonic increasing or decreasing boundaries. By definition, root signals cannot contain any impulses or oscillations, i.e., signals with a width less than N+1. When a corrupted binary signal is passed through the median filter, the filter removes the impulses in the regions where the signal should be a binary zero or binary one.

Figure 9D:
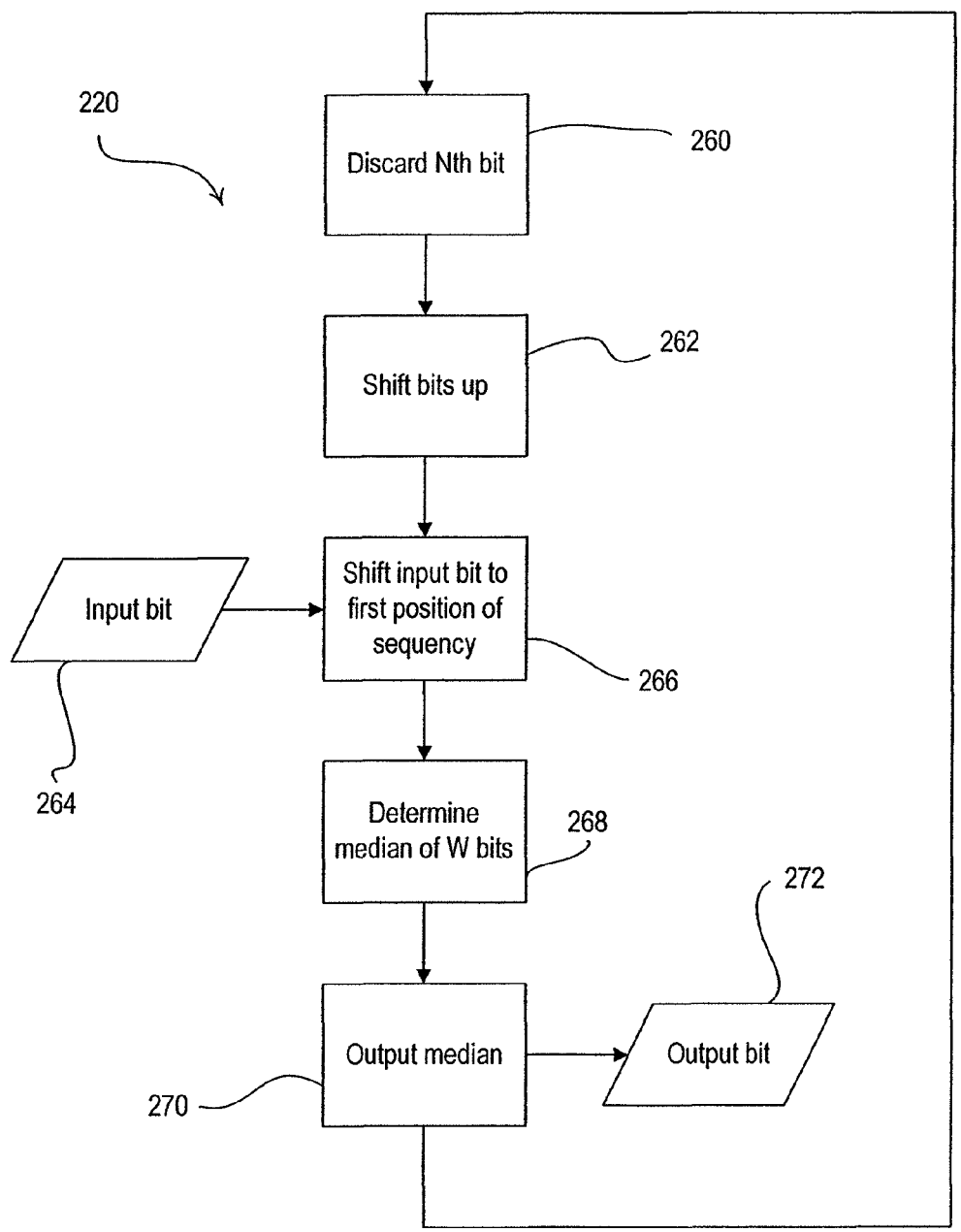
FIG. 9D is a simplified flowchart of the process of the median filter of the receiver routine of FIG. 8.

FIG. 9D is a flowchart of the median filter 220 according to the present invention. The median filter 200 examines W samples of the corrupted Manchester encoded stream 252 at a time. For a $3^{rd}$ order median filter, seven samples are examined since $$W_{(N=3)} = 2N+1 = 7 \quad \text{. (Equation 2)}$$

After the median filter 220 has finished processing the previous W samples, the median filter discards the Nth sample, i.e., the first of the W samples that was received by the median filter at step 260. At step 262, the median filter 220 shifts the samples up leaving the first sample of the W samples empty and available to receive a new sample. The median filter 220 receives a new input sample 264 from the corrupted Manchester encoded stream 252 and shifts the sample into the first position of the sequence of W samples at step 266.

Next, the median filter 200 determines the median of the W samples at step 268. According to a first embodiment of the present invention, the median filter 200 groups (i.e., orders) the ones and zeros of the W samples and determines the value of the middle sample. For example, if the present W samples are 1 0 1 1 0 0 1, the median filter 220 will group the zeros and the ones to form a sorted sample stream 0 0 0 1 1 1 1.

The median for the sorted sample stream is one, since the median or middle value is one.

According to a second embodiment of the present invention, the median filter 220 counts the number of ones in the W samples to determine the median at step 268. For an Nth order median filter, the median is one if the count of the ones is greater than or equal to the value of N+1. Otherwise, the median is zero. Thus, for a $3^{rd}$ order median filter, if there are four ones in the W samples, the median will be equal to one. Accordingly, the width W of the median filter 220 must always be an odd number, i.e., 2N+1. The median filter 220 is preferably implemented with a lookup table that counts the ones and returns a one if the count is greater than or equal to N+1 or a zero otherwise. By using the lookup table, the filtering process is able to complete in a few instruction cycles thereby making the computation on a microcontroller exceptionally fast.

Finally, at the step 270, the median filter 220 provides the median determined in step 268 as the output sample 272 to form the filtered Manchester encoded stream 254 (shown in FIG. 9C). The median filter 220 removes the noise impulses 252A from the corrupted Manchester encoded stream 252. As a result of the filtering, the rising and falling edges of the filtered Manchester encoded stream 254 may occur at different times than the rising and falling edges of the original Manchester encoded stream 250. Since the data is encoded in the Manchester encoded stream 250 by generating a rising edge or falling edge during a predetermined period of time, it is not critical exactly when the rising and falling edges occur in the filtered Manchester encoded stream 254 at the time of decoding. It is only important that incorrect rising and falling edges are removed from encoded stream.

Referring back to FIG. 8, after passing through the median filter 220 one or more times, the signal passes through a Manchester decoder 222 to produce a digital bit stream from the Manchester-encoded bit stream that is received. The decoded signal and a pseudo random orthogonal synchronization code 224 are fed to a cross correlator 226. The output of the cross correlator 226 is integrated by an integrator 228 and provided to a threshold detector 230. This processing occurs in real time with the output of the receiver routine 208 updated at the bit rate of the sequence.

At the cross correlator 226, the bit stream from the Manchester decoder 222 and the pseudo random orthogonal synchronization code 224 are input to an exclusive NOR (XNOR) logic gate. The number of ones in the output of the XNOR gate is counted to perform the integration at the integrator 228. A lookup table is utilized to count the ones during the integration. Since the codes are orthogonal, the correlation will be small unless the codes match. The match does not have to be exact, merely close, for example a 75% match.

If the synchronization code is detected at step 232, the next M decoded bits (i.e., the message code 198) from the Manchester decoder 222 are saved at step 234. The forward error correction message codes 236 are then compared to the M decoded bits to find the best match, which determines the command at step 238 and the command is executed at step 240. This step is known as maximum likelihood decoding and is well known in the art. At step 232, if the synchronization code is not detected, the data is discarded and the process exits.

After receiving a decoded message, the controller will transmit an acknowledgement (ACK) to the device that transmitted the received message. Transmitting the ACK allows for a reliable communication scheme.

Figure 10A:
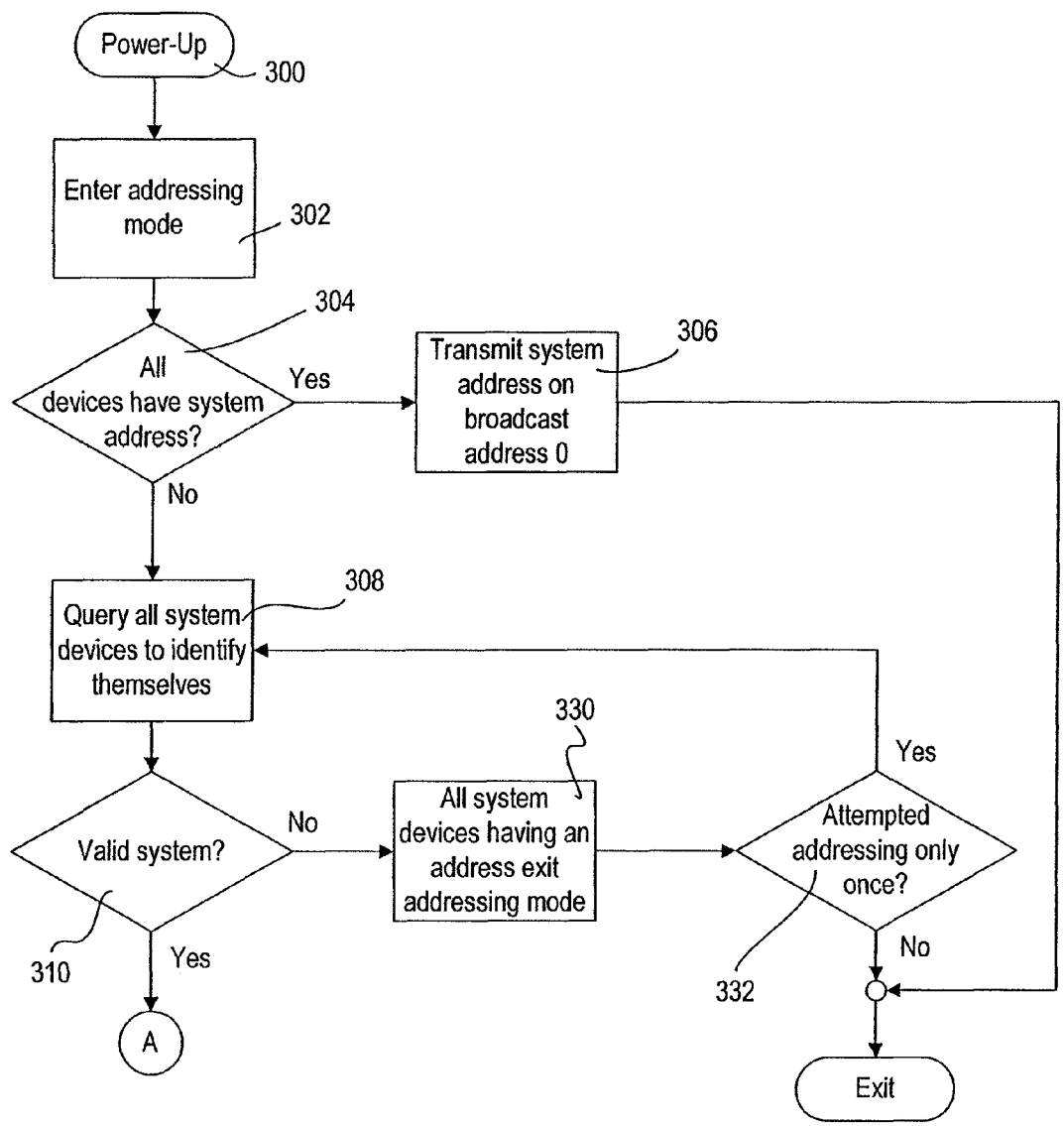
FIGS. 10A and 10B show a simplified flowchart of an automatic addressing algorithm of the system of FIG. 2.
Figure 10B:
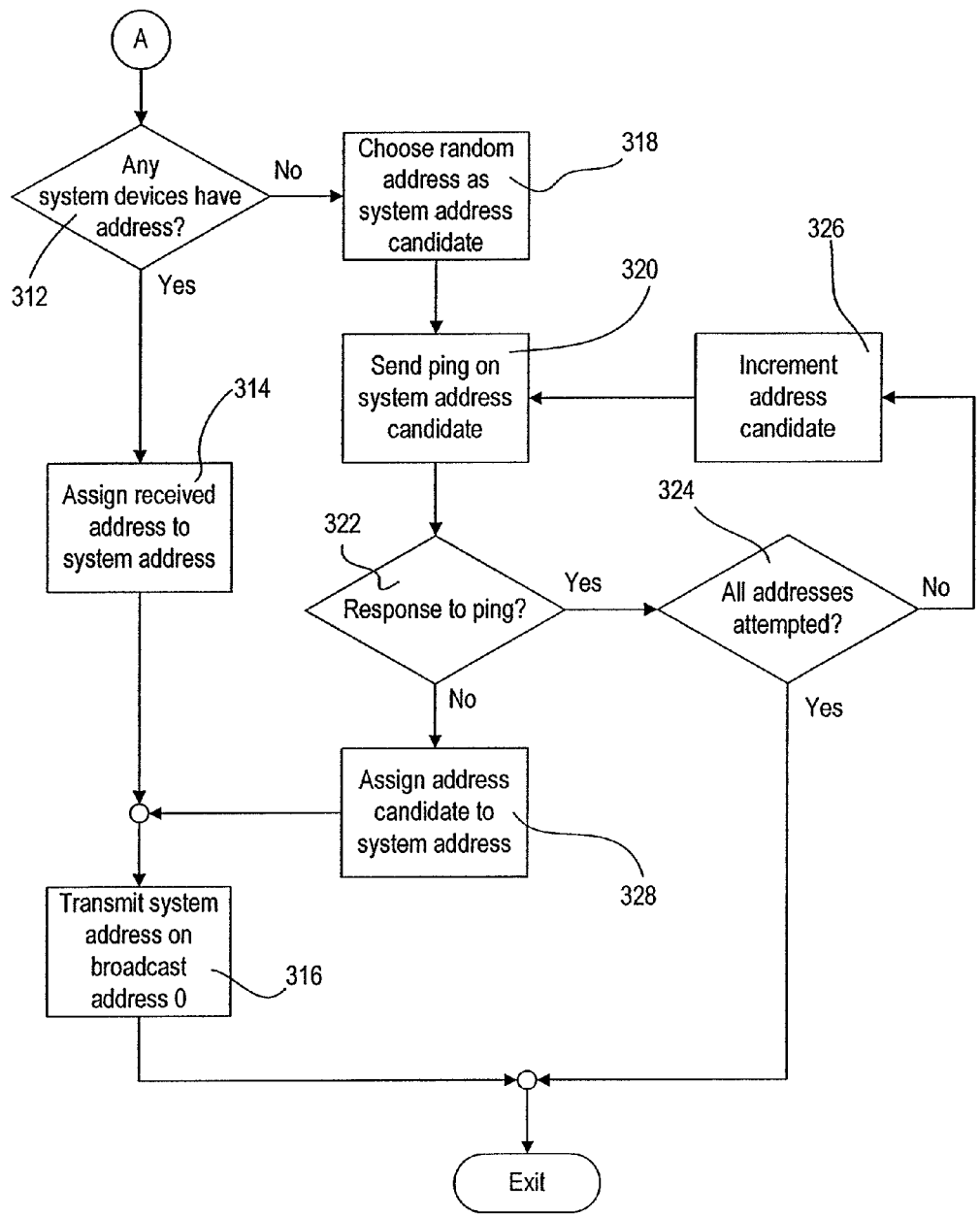

The devices of the system 100 for independent control of lights and fan motors all communicate using a system address. In order to establish a system address to use, the wallstations 104 and the light/motor control unit 105 execute an automatic addressing algorithm upon power up. FIGS. 10A and 10B show a simplified flowchart of the automatic addressing algorithm.

Since the devices of system 100 are connected in a loop topology, it is possible to cause all devices to power up at one time by toggling (i.e., opening, then closing) the air-gap switch 117 of one of the wallstations 104. Upon power-up at step 300, the devices in the system 100 will enter an addressing mode at step 302, meaning that the device is eligible to participate in the addressing algorithm and will communicate with other devices of the system using a broadcast system address 0. In addressing mode, devices use a random back-off time when transmitting to minimize the probability of a collision since there could be many unaddressed devices in the system. After a suitable timeout period, e.g., 20 seconds, the devices leave the addressing mode.

First, the present device determines if all of the devices in the system have a system address at step 304. Specifically, upon power-up, all devices that do not have a system address will transmit an address initiation request. At step 304, the device waits for a predetermined amount of time to determine if any address initiation requests are transmitted. If the device determines that all devices in the system have the system address at step 304, the device transmits the system address to all devices at step 306.

If all devices in the system do not have a system address at step 304, the present device transmits a query message to each device at step 308. The devices of the system will respond to the query message by transmitting the system address and their device type,=(i.e., a wallstation 104 or a light/motor control unit 105). At step 310, the present device determines if the system 100 is a "valid" system. A valid system includes at least one wallstation 104 and at least one light/motor control unit 105 and does not have more than one system address, i.e., no two devices of the system have differing system addresses. If the system is a valid system at step 310, the present device then determines if any of the devices of the system 100 have a system address at step 312. If at least one device has a system address, the present device saves the received address as the system address at step 314 and transmits the received address at step 316.

If the no devices have a system address at step 312, the present device attempts to select a new system address. At step 318, the device chooses a random address M, i.e., a random selection from the allowable address choices, as the system address candidate. For example, there may be 15 possible system addresses, i.e., 1-15. Since there may be neighboring systems already having address M assigned, the device transmits a "ping", i.e., a query message, using address M at step 320 to verify the availability of the address. If any devices respond to the ping, i.e., the address M is already assigned, at step 322, the device begins to step through all of the available system addresses. If all available system addresses have not been attempted at step 324, the device selects the next available address (e.g., by incrementing the system address candidate) at step 326, and transmits another ping at step 320. Otherwise, the process simply exits. Once a suitable address M has been verified as being available, i.e., no devices respond at step 322, the present device sets the system address candidate as the system address at step 328, and transmits address M on the broadcast channel 0 at step 316. Accordingly, all unaddressed devices in addressing mode then save address M as the system address. The process then exits.

If the system 100 is not a valid system at step 310, then all system devices that presently have the system address exit the addressing mode at step 330. If the addressing assignment has only been attempted once at step 332, then the device transmits another query message at step 308. Otherwise, the process simply exits.

As a recovery method, an address reset is included that re-addresses all devices in the system 100. After power-up, i.e., when all the devices in the system are in addressing mode, a special key sequence may be entered by a user at the user interface 114 of the wallstation 104. Upon receipt of this input from the user interface 114, the controller 112 of the wallstation 104 transmits a message signal containing a "reset address" command over the power wiring to all devices. When a device in the addressing mode receives the reset address command, the device will set itself to the unaddressed state, i.e., the device will only be responsive to messages transmitted with the broadcast system address 0 while in the addressing mode. The address assignment algorithm then proceeds as if all devices in the system 100 do not have a system address.

Although the words "device" and "unit" have been used to describe the elements of the systems for control of lights and fan motors of the present invention, it should be noted that each "device" and "unit" described herein need not be fully contained in a single enclosure or structure. For example, the light/motor control unit 105 may comprise a controller in a wall-mounted device and fan motor control circuit in a separate location, e.g., in the canopy of the fan motor and the lamp. Also, one "device" may be contained in another "device".

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A load control system for controlling the power delivered from an AC voltage source to an electrical load, the system comprising:
   a load control device adapted to be coupled to the electrical load for controlling the power delivered to the electrical load, such that a load current flows from the AC voltage source to the electrical load through the load control device, the load control device comprising a first current transformer having a primary winding adapted to be coupled in series electrical connection between the AC source and the electrical load, such that the primary winding of the first current transformer conducts the load current, the load control device further comprising a first communication circuit coupled to a secondary winding of the first current transformer for receiving message signals; and
   a two-wire remote control device comprising a second current transformer having a primary winding adapted to be coupled in series electrical connection with the primary winding of the first current transformer between the AC source and the electrical load, such that the primary winding of the second current transformer conducts the load current, the remote control device further comprising a second communication circuit coupled to a secondary winding of the second current transformer for transmitting the message signals; and
   wherein the primary windings of the first current transformer and the second current transformer are operable to conduct a communication loop current, the first communication circuit operable to receive and the second communication circuit operable to transmit the message signals via the communication loop current, further wherein the load control device comprises a first capacitor coupled in shunt electrical connection with the load, such that the first capacitor and the primary windings of the first and second current transformers are operable to conduct the communication loop current.

2. The load control system of claim 1, wherein the first communication circuit of the load control device and the second communication circuit of the remote control device are operable to both transmit and receive the message signals via the communication loop current.

3. The load control system of claim 2, wherein the first and second communication circuits each comprise a code generator operable to use Manchester encoding to generate an encoded signal from the message signal and a modulator operable to modulate the communication current loop with the encoded signal to produce a modulated signal.

4. The load control system of claim 3, wherein the first and second communication circuits each comprise a demodulator operable to demodulate the modulated signal to produce a detected encoded signal, and a median filter operable to remove impulsive noise signals from the detected encoded signal.

5. The load control system of claim 2, wherein the load control device is coupled to a plurality of electrical loads and is operable to individually control each of the plurality of electrical loads.

6. The load control system of claim 5, wherein the plurality of electrical loads comprises an electric motor and an electric light.

7. The load control system of claim 1, wherein the primary windings of the first and second current transformers are coupled to the AC voltage source, such that the AC voltage source and the primary windings of the first and second current transformers are operable to conduct the communication loop current.

8. The load control system of claim 1, further comprising a second capacitor coupled across the AC voltage source, such that the second capacitor and the primary windings of the first and second current transformers are operable to conduct the communication loop current.

9. A load control device for a load control system for controlling the power delivered from an AC voltage source to an electrical load, the load control system comprising a remote control device adapted to be coupled in series between the AC voltage source and the electrical load, the load control device comprising:
a load control circuit adapted to be coupled to the electrical load for control of the load, such that a load current is operable to flow from the AC voltage source to the electrical load through the load control device;
a current transformer having a primary winding and a secondary winding, the primary winding adapted to be coupled in series electrical connection with the remote control device between the AC voltage source and the electrical load, such that the primary winding conducts the load current; and
a communication circuit coupled to the secondary winding of the current transformer for receiving message signals;
wherein the primary winding of the current transformer is adapted to be coupled in series electrical connection with a primary winding of a current transformer of the remote control device, such that the primary windings of the current transformers of the load control device and the remote control device are operable to conduct a communication loop current, and the load control device is operable to receive the message signals for controlling the electrical load from the remote control device via the communication loop current, further comprising a first capacitor adapted to be coupled in shunt electrical connection with the load, such that the first capacitor and the primary windings of the current transformers of the load control device and the remote control device are operable to conduct the communication loop current.

10. The load control device of claim 9, further comprising:
a second capacitor adapted to be coupled across the AC voltage source, such that the first and second capacitors and the primary windings of the current transformers of the load control device and the remote control device are operable to conduct the communication loop current.

11. The load control device of claim 9, wherein the electrical load comprises a lighting load and the load control circuit comprises a dimmer circuit for adjusting the intensity of the lighting load.

12. The load control device of claim 9, wherein the electrical load comprises a motor, and the load control circuit comprises a motor control circuit for adjusting the speed of the motor.

13. A method for communicating between a first control circuit portion and a second control circuit portion over electrical power wiring of a building to control the operation of an electrical load, the first control circuit portion having a user actuable control for remotely controlling the load controlled by the second control circuit portion, the method comprising the steps of:
conducting a load current through the electrical load from an AC voltage source;
coupling a winding of a first current transformer of the first control circuit portion to the electrical power wiring, such that the winding of the first current transformer conducts the load current;
coupling a winding of a second current transformer of the second control circuit portion to the electrical power wiring in series electrical connection with the winding of the first current transformer and the AC voltage source, such that the winding of the second current transformer conducts the load current;
establishing a current signal loop in the electrical power wiring between the first and second current transformers;
providing a capacitor coupled in shunt electrical connection with the load, such that the capacitor and the primary windings of the first and second current transformers are operable to conduct the current loop signal;
transmitting control information over the electrical power wiring from the first control circuit portion to the second control circuit portion; and
receiving the control information at the second circuit portion for controlling the load.

14. The method of claim 13, wherein said step of transmitting comprises the steps of:
modulating a carrier signal with the control information; and
coupling the modulated carrier signal onto the signal loop through the current transformers.

15. The method of claim 14, wherein said step of receiving comprises the steps of:
demodulating the modulated carrier signal;
applying a median filter to remove impulsive noise; and
producing a detected signal containing the control information.

16. The method of claim 13, wherein the step of transmitting comprises the steps of:
encoding the control information;
modulating a carrier signal with the encoded control information; and
coupling the modulated carrier signal onto the signal loop through the current transformers.

17. The method of claim 16, wherein the step of receiving comprises the step of:
median filtering the demodulated carrier signal at the second control circuit portion to remove impulsive noise signals from said modulated carrier signal.

18. The load control system of claim 1, wherein the load control device has a neutral terminal connected to the AC voltage source neutral line.

19. The load control device of claim 9, wherein the load control device has a neutral terminal connected to the AC voltage source neutral line.

20. The method of claim 13, wherein the second circuit portion has a neutral terminal connected to the AC voltage source neutral line.

* * * * *